(No Model.)
W. & G. HEYWOOD.
APPARATUS FOR AUTOMATICALLY DISINFECTING WATER CLOSETS, &c.
No. 439,152. Patented Oct. 28, 1890.
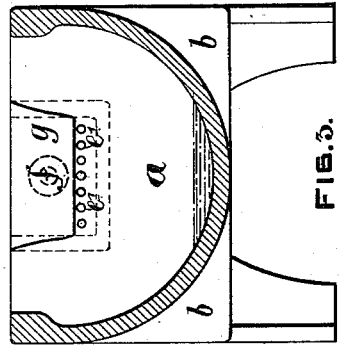
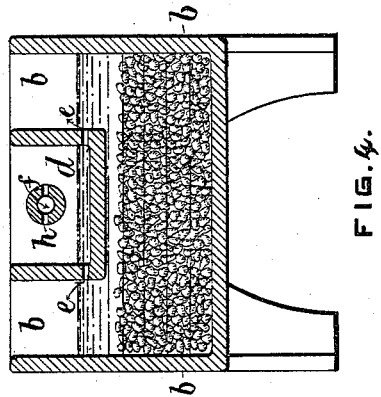
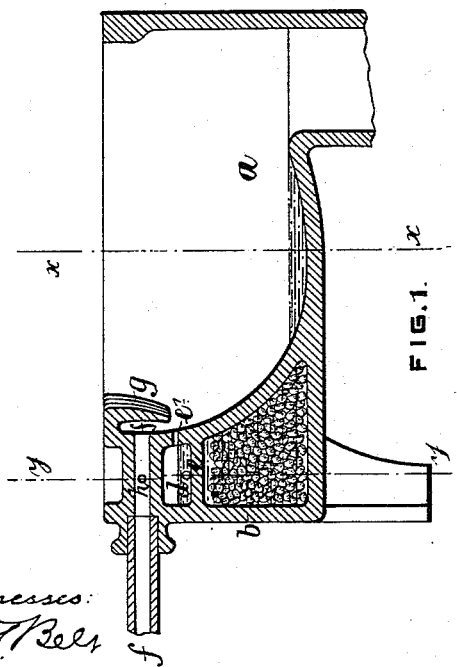
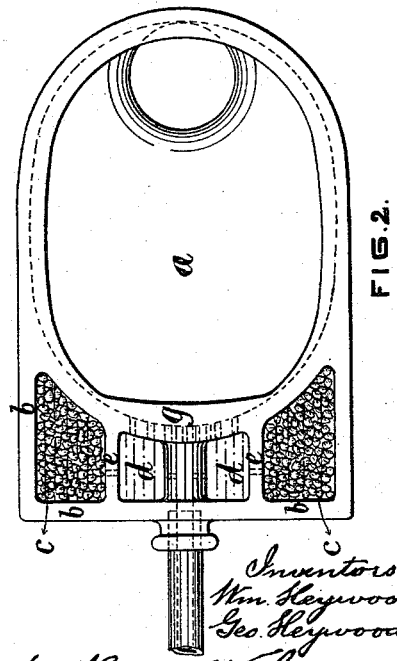

United States Patent Office.

WILLIAM HEYWOOD, OF MANCHESTER, AND GEORGE HEYWOOD, OF MIDDLETON, ENGLAND.

APPARATUS FOR AUTOMATICALLY DISINFECTING WATER-CLOSETS, &c.

SPECIFICATION forming part of Letters Patent No. 439,152, dated October 28, 1890.

Application filed March 13, 1890. Serial No. 343,727. (No model.) Patented in England October 26, 1888, No. 15,411.

*To all whom it may concern:*

Be it known that we, WILLIAM HEYWOOD, of Manchester, England, and GEORGE HEYWOOD, of Middleton, England, have invented certain new and useful Improvements in Apparatus for Disinfecting Water-Closets and Urinals, (for which we have obtained Letters Patent in Great Britain, No. 15,411, dated October 26, 1888,) of which the following is a specification.

This invention relates to water-closets and urinals; and it consists in the novel construction and combination of the parts, hereinafter fully described and claimed, whereby the pan is supplied with disinfecting material.

In the drawings, Figure 1 is a vertical longitudinal section through the pan. Fig. 2 is a plan view of the pan. Fig. 3 is a cross-section on line $x$ $x$ in Fig. 1. Fig. 4 is a cross-section on line $y$ $y$ in Fig. 1.

A pan $a$, which may be a portion of a water-closet or urinal, is provided with a water-flushing pipe $f$ and shield $g$ at its upper part in the ordinary manner.

A reservoir $d$ is formed adjacent to the pan below and surrounding the pipe $f$, and chambers $b$, filled with permanganate of potash $c$ or other similar disinfecting material, are arranged upon each side of the reservoir at the back of the pan. Holes $e$ are provided in the sides of reservoir $d$, so that it may communicate freely with chambers $b$, and $e'$ are holes in the pan side communicating with said reservoir at a higher level than the holes $e$. Holes $h$ are formed in the side of pipe $f$ and communicate with the reservoir $d$ at a higher level than either of the holes $e$ or $e'$. The pan, reservoir, and chambers may be made integral, as shown, and of earthenware, or the chambers may be made separately and secured to the pan, and the chambers may extend wholly or only partially around it. The chambers are preferably open-topped, so that the surrounding air may be disinfected by the chemical used. The reservoir $d$ and chambers $b$ are first filled with water up to the level of holes $e'$, so that the reservoir $d$ holds a solution of the disinfectant $c$. Each time water passes down pipe $f$ to flush the pan a portion of the water passes through holes $h$ into the reservoir $d$ and displaces a corresponding portion of the solution, which passes out through holes $e'$ into the pan.

What I claim is—

1. The combination, with a pan, of a chamber for disinfectant, a reservoir for solution provided with holes $e$, communicating with said chamber, and holes $e'$ at a higher level communicating with the pan, and the flushing-pipe provided with holes $h$, communicating with the reservoir above the level of the aforesaid holes, substantially as and for the purpose set forth.

2. The combination, with the pan, of the open-topped chambers for disinfectant at the rear of the pan, the central reservoir for solution provided with holes $e$, communicating with said chamber, and holes $e'$ at a higher level communicating with the pan, and the flushing-pipe passing through the said reservoir and communicating therewith by holes $h$ above the level of the aforesaid holes, substantially as and for the purpose set forth.

In testimony whereof we affix our signatures to the foregoing specification.

WILLIAM HEYWOOD.
GEORGE HEYWOOD.

Witnesses:
JOHN G. WILSON,
WALTER GUNN.